United States Patent
Seymour et al.

(10) Patent No.: US 9,172,296 B2
(45) Date of Patent: Oct. 27, 2015

(54) COMMON MODE FILTER SYSTEM AND METHOD FOR A SOLAR POWER INVERTER

(75) Inventors: Eric Seymour, Fort Collins, CO (US); Jack Arthur Gilmore, Fort Collins, CO (US); Mike Armstrong, Loveland, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 1214 days.

(21) Appl. No.: 12/122,950

(22) Filed: May 19, 2008

(65) Prior Publication Data
US 2008/0291706 A1    Nov. 27, 2008

Related U.S. Application Data

(60) Provisional application No. 60/939,807, filed on May 23, 2007.

(51) Int. Cl.
*H02M 1/12* (2006.01)

(52) U.S. Cl.
CPC ........ *H02M 1/126* (2013.01); *H02M 2001/123* (2013.01); *Y02E 10/56* (2013.01)

(58) Field of Classification Search
CPC ....... Y02E 10/58; Y02E 10/563; Y02E 10/56; Y02E 40/22; H02J 3/383; H02J 3/382; H02J 7/35; H02M 2001/007; H02M 1/44; H02M 1/15; H03H 7/1758; H03H 7/1766
USPC ...................... 363/39, 40–43, 56.02, 98, 132; 307/102, 105
See application file for complete search history.

(56) References Cited

U.S. PATENT DOCUMENTS

| | | | |
|---|---|---|---|
| 3,986,097 A | 10/1976 | Woods |
| 4,025,862 A | 5/1977 | Gautheron |
| 4,054,827 A | 10/1977 | Reimers |
| 4,080,646 A | 3/1978 | Dietrich |
| 4,128,793 A | 12/1978 | Stich |
| 4,161,023 A | 7/1979 | Goffeau |

(Continued)

FOREIGN PATENT DOCUMENTS

| | | |
|---|---|---|
| CN | 101119031 A1 | 2/2008 |
| JP | 08-98549 A1 | 2/1978 |

(Continued)

OTHER PUBLICATIONS

IEEE, "Std. 519-1992", "IEEE", Apr. 12, 1993, Publisher: IEEE.

(Continued)

*Primary Examiner* — Adolf Berhane
*Assistant Examiner* — Henry Lee, III
(74) *Attorney, Agent, or Firm* — Neugeboren O'Dowd PC

(57) ABSTRACT

A photovoltaic system, method and apparatus are disclosed. In an exemplary embodiment, the system includes a photovoltaic array, a distribution system that distributes power within a premises of a demand-side energy consumer, an inverter coupled to the distribution system that is configured to convert DC power from the photovoltaic array to AC power and apply the AC power to the distribution system, a damping portion configured to damp high frequency voltages derived from the inverter, and trapping circuitry coupled to the damping portion that is configured to reduce a level of low frequency current traveling through the damping portion.

13 Claims, 6 Drawing Sheets

(56) References Cited

U.S. PATENT DOCUMENTS

| | | | |
|---|---|---|---|
| 4,531,085 A * | 7/1985 | Mesenhimer | 323/214 |
| 4,678,983 A | 7/1987 | Rouzies | |
| 4,748,311 A | 5/1988 | Thomas | |
| 4,768,096 A | 8/1988 | Cannella et al. | |
| 5,270,636 A | 12/1993 | Lafferty | |
| 5,451,962 A | 9/1995 | Steigerwald | |
| 5,781,419 A | 7/1998 | Kutkut et al. | |
| 5,923,100 A | 7/1999 | Lukens et al. | |
| 5,932,994 A | 8/1999 | Jo et al. | |
| 6,093,885 A | 7/2000 | Takehara et al. | |
| 6,115,273 A | 9/2000 | Geissler | |
| 6,266,260 B1 | 7/2001 | Zahrte, Sr. et al. | |
| 6,404,655 B1 | 6/2002 | Welches | |
| 6,414,866 B2 * | 7/2002 | Huggett et al. | 363/124 |
| 6,625,046 B2 | 9/2003 | Geissler | |
| 6,750,391 B2 * | 6/2004 | Bower et al. | 136/244 |
| 6,812,396 B2 | 11/2004 | Makita et al. | |
| 6,844,739 B2 | 1/2005 | Kasai et al. | |
| 6,914,418 B2 | 7/2005 | Sung | |
| 7,053,506 B2 | 5/2006 | Alonso et al. | |
| 7,158,395 B2 * | 1/2007 | Deng et al. | 363/95 |
| 7,193,872 B2 * | 3/2007 | Siri | 363/95 |
| 7,292,419 B1 | 11/2007 | Nemir | |
| 7,371,963 B2 * | 5/2008 | Suenaga et al. | 136/205 |
| 7,456,524 B2 | 11/2008 | Nielsen et al. | |
| 7,619,200 B1 | 11/2009 | Seymour et al. | |
| 7,701,081 B2 | 4/2010 | Seymour | |
| 7,768,751 B2 | 8/2010 | Gilmore et al. | |
| 2001/0004322 A1 | 6/2001 | Kurokami et al. | |
| 2001/0023703 A1 | 9/2001 | Kondo et al. | |
| 2001/0048605 A1 | 12/2001 | Kurokami et al. | |
| 2002/0105765 A1 | 8/2002 | Kondo et al. | |
| 2003/0111103 A1 | 6/2003 | Bower et al. | |
| 2003/0155887 A1 | 8/2003 | Bourilkov et al. | |
| 2003/0172968 A1 | 9/2003 | Armer et al. | |
| 2004/0041665 A1 * | 3/2004 | Hode et al. | 333/175 |
| 2004/0211459 A1 | 10/2004 | Suenaga et al. | |
| 2005/0139259 A1 | 6/2005 | Steigerwald | |
| 2005/0180181 A1 | 8/2005 | Gaudreau et al. | |
| 2005/0279402 A1 | 12/2005 | Ahn et al. | |
| 2006/0162772 A1 | 7/2006 | Presher, Jr. et al. | |
| 2006/0171182 A1 | 8/2006 | Siri et al. | |
| 2006/0221653 A1 | 10/2006 | Lai et al. | |
| 2006/0227472 A1 | 10/2006 | Taylor et al. | |
| 2008/0291706 A1 | 11/2008 | Seymour et al. | |
| 2009/0032082 A1 | 2/2009 | Gilmore et al. | |
| 2009/0078304 A1 | 3/2009 | Gilmore et al. | |
| 2009/0167086 A1 | 7/2009 | Seymour | |
| 2009/0167097 A1 | 7/2009 | Seymour et al. | |
| 2009/0190275 A1 | 7/2009 | Gilmore et al. | |
| 2009/0217964 A1 | 9/2009 | Gilmore et al. | |
| 2009/0283130 A1 | 11/2009 | Gilmore et al. | |
| 2010/0132758 A1 | 6/2010 | Gilmore | |
| 2010/0308662 A1 | 12/2010 | Schatz et al. | |
| 2011/0157753 A1 | 6/2011 | Gilmore et al. | |
| 2011/0168229 A1 | 7/2011 | Gilmore et al. | |

FOREIGN PATENT DOCUMENTS

| | | |
|---|---|---|
| JP | 05-025890 A | 2/1993 |
| JP | 06-252434 A | 9/1994 |
| JP | 07-049721 A | 2/1995 |
| JP | 8167822 | 6/1996 |
| JP | 09-054623 A2 | 2/1997 |
| JP | 10-014111 | 1/1998 |
| JP | 10-229679 | 8/1998 |
| JP | 11-285260 A | 10/1999 |
| JP | 2000-295786 A | 10/2000 |
| JP | 2000305633 A | 11/2000 |
| JP | 2000324852 A | 11/2000 |
| JP | 2000-358370 A | 12/2000 |
| JP | 2001-68706 A | 3/2001 |
| JP | 2002-319687 A | 10/2002 |
| JP | 2002359385 A | 12/2002 |
| JP | 2003-124492 A | 4/2003 |
| JP | 2004-015941 A | 1/2004 |
| JP | 2004-343909 A | 12/2004 |
| JP | 2005-204485 A | 7/2005 |
| JP | 2006-187150 A | 7/2006 |
| JP | 2007133765 A | 5/2007 |
| JP | 2007-201257 A | 8/2007 |
| KR | 10-2005-0078537 A | 8/2005 |
| KR | 2005078537 A * | 8/2005 |
| KR | 10-2006-0100840 | 9/2006 |
| KR | 20-2006-0021132 | 10/2006 |
| WO | 0180321 A1 | 10/2001 |
| WO | 2007022955 A1 | 8/2006 |
| WO | 2010065388 A1 | 6/2010 |
| WO | 2011011022 A1 | 1/2011 |
| WO | 2011094654 A1 | 8/2011 |

OTHER PUBLICATIONS

Junghan Kim, "A Study on the Harmonic Elimination used Passive Filter and Active Filter", "KIIEE", 2001, Publisher: KIIEE.

Khaled H. Ahmed, "Passive Filter Design for Three-Phase Inverter Interfacing in Distributed Generation", "Electrical Power Quality and Utilization Journal", 2007, Page(s) abstract, Fig. 1-19, vol. 13, No. 2.

Choi, Nam Ho, "Written Opinion of the International Searching Authority", Korean Intellectual Property Office, Oct. 31, 2008.

Timothy CY Wang, "Output Filter Design for a Grid-interconnected Three-Phase Inverter", "IEEE", 2003, Publisher: IEEE, Published in: US.

Woo-Hyuk Lee, "A Study on the Optimaztion of Input Filter for Switching Inverter", "Master Thesis", 1989, Publisher: Hanyang University.

Nguyen, Danny, "Office Action re U.S. Appl. No. 12/830,380", Jun. 3, 2011, p. 28, Published in: US.

Gardner, Shannon M., "Office Action re U.S. Appl. No. 12/184,535", Jun. 17, 2011, p. 9, Published in: US.

Bernier, Lindsey A., "Office Action re U.S. Appl. No. 12/326,209", Jun. 28, 2011, p. 7, Published in: US.

Borroto, Alfonso Perez, "Office Action re U.S. Appl. No. 12/507,019", Nov. 14, 2011, p. 51, Published in: US.

Korean Intellectual Property Office, "Office Action re Korean Application No. 10-2009-7025699", Jun. 1, 2011, p. 12, Published in: KR.

Guinea, William, "PCT International Search Report re Application No. PCT/US09/065629", Feb. 12, 2010, Published in: PCT.

Athina Nickitas-Etienne, "International Preliminary Report on Patentability re Application No. PCT/US09/65629", Jun. 16, 2011, Published in: CH.

Sean R. O'Dowd, "Response to Jun. 28, 2011 Office Action re U.S. Appl. No. 12/326,209", Jul. 28, 2011, Published in: US.

Sean R. O'Dowd, "Response to Jun. 3, 2011 Office Action re U.S. Appl. No. 12/830,380", Sep. 16, 2011, Published in: US.

Wang, T.C., et al., "Output Filter Design for a Grid-Interconnected Three-Phase Inverter", "IEEE", 2003, pp. 779-784, Publisher: IEEE, Published in: US.

Kolev, Vesselin, "International Search Report and Written Opinion re Application PCT/US11/023081", Apr. 27, 2011, p. 12 Published in: AU.

Gilmore, Jack Arthur, "pending U.S. Appl. No. 12/830,380 'Energy Conversion System with Fault Detection and Interruption'", Jul. 5, 2010, Published in: US.

Yao, Gang, et al., "Interleaved Three-Level Boost Converter with Zero Diode Reverse-Recovery Loss", "Applied Power Electronics Conference and Exposition", Sep. 1, 2004, pp. 1090-1095, vol. 2, Publisher: IEEE, Published in: US.

Zhang, Michael T., et al., "Single-Phase Three-Level Boost Power Factor Correction Converter", "Applied Power Electronic Conference and Exposition", Mar. 1, 1995, pp. 434-439, vol. 1, Publisher: IEEE, Published in: US.

Gow, J.A., et al., "Photovoltaic Converter System Suitable for Use in Small Scale Stand-Alone or Grid Connected Applications", "Proceedings Electric Power Applications", Nov. 1, 2000, pp. 535-543, vol. 147, No. 6, Publisher: IEEE, Published in: US.

(56) References Cited

OTHER PUBLICATIONS

Pinheiro, J.R., et al., "Dual Output Three-Level Boost Power Factor Correction Converter with Unbalanced Loads", "Power Electronics Specialists Conference", Jun. 1, 1996, pp. 733-739, vol. 1, Publisher: IEEE, Published in: US.
Kwon, Jung-Min, et al., "Photovoltaic Power Conditioning System with Line Connection", "Transaction on Industrial Electronics", Aug. 1, 2006, pp. 1048-1054, vol. 53, No. 4, Publisher: IEEE, Published in: US.
Enslin, Johan, et al., "Integrated Photovoltaic Maximum Power Point Tracking Converter", "Transactions on Industrial Electronics", Dec. 1, 1997, pp. 769-773, vol. 44, No. 6, Publisher: IEEE, Published in: US.
Walker, Geoffrey R., et al., "Cascaded DC-DC Converter Connection of Photovoltaic Modules", "Transactions on Power Electronics", Jul. 1, 2004, pp. 1130-1139, vol. 19, No. 4, Publisher: IEEE, Published in: US.
Choi, Nam Ho, "PCT International Search Report re Application No. PCT/US08/064263", Oct. 31, 2008, Published in: PCT.
Park, Jae Hun, "PCT International Search Report re Application No. PCT/US08/072108", Feb. 24, 2009, Published in: PCT.
Giffo-Schmitt, Beate, "PCT International Preliminary Report on Patentability re PCT/US08/077724", May 27, 2010, Published in: PCT.
Koh, Jae Hyun, "PCT International Search Report re Application No. PCT/US08/077734", Apr. 29, 2009, Published in: PCT.
Bae, Jin Yong, "PCT International Search Report re Application No. PCT/US08/086931", Jun. 25, 2009, Published in: PCT.
Bae, Jin Yong, "PCT International Search Report re Application No. PCT/US08/087078", Jul. 9, 2009, Published in: PCT.
Han, Sang Il, "PCT International Search Report re Application No. PCT/US09/031549", Aug. 17, 2009, Published in: PCT.
Ha, Jeong Kyun, "PCT International Search Report re Application No. PCT/US09/051855", Mar. 22, 2010, Published in: PCT.
Sun Power, "Sun Power Discovers the Surface Polarization Effect in High Efficiency Solar Cells", Aug. 1, 2005, Published in: US.
Sohn, Seung C., "Notice of Non-Compliant Amendment re U.S. Appl. No. 12/189,187", Aug. 12, 2009, p. 2, Published in: US.
Nguyen, Danny, "Office Action re U.S. Appl. No. 12/022,147", Jan. 22, 2010, p. 46, Published in: US.
Sohn, Seung C., "Office Action re U.S. Appl. No. 12/189,187", Apr. 3, 2009, p. 14, Published in: US.
Sohn, Seung C., "Office Action re U.S. Appl. No. 11/967,933", Oct. 4, 2010, p. 29, Published in: US.
Gardner, Shannon M., "Office Action re U.S. Appl. No. 12/184,535", Nov. 10, 2010, p. 7, Published in: US.
Moyse, Ellen, "International Preliminary Report on Patentability and Written Opinion re Application No. PCT/US08/072108", Feb. 18, 2010, Published in: PCT.
Nickitas-Etienne, Athina, "PCT International Preliminary Report on Patentability and Written Opinion re PCT/US09/031549", Aug. 12, 2010, Published in: PCT.
Honda, Masashi, "International Preliminary Report on Patentability and Written Opinion re Application PCT/US09/051855", Feb. 24, 2011, Published in: PCT.
Ha, Jeong Kyun, "PCT International Search Report re Application No. PCT/US09/054904", Aug. 23, 2010, Published in: PCT.
O'Dowd, Sean R., "Response to Oct. 4, 2010 Office Action re U.S. Appl. No. 11/967,933", Jan. 1, 2011, p. 6, Published in: US.
O'Dowd, Sean R., "Response to Jan. 22, 2010 Office Action re U.S. Appl. No. 12/022,147", Feb. 25, 2010, p. 28, Published in: US.
O'Dowd, Sean R., "Response to Nov. 10, 2011 Office Action re U.S. Appl. No. 12/184,535", Mar. 10, 2011, p. 14, Published in: US.
O'Dowd, Sean R., "Response to Apr. 3, 2009 Office Action re U.S. Appl. No. 12/189,187", Jun. 29, 2009, p. 51, Published in: US.
O'Dowd, Sean R., "Response to Notice of Non-Compliant Amendment re U.S. Appl. No. 12/189,187", Aug. 13, 2009, p. 10, Published in: US.
Chinese Patent Office, "Second Office Action re Chinese Application No. 200880101640.4", Mar. 21, 2012, p. 29, Published in: CN.
Chinese Patent Office, "Office Action re Chinese Patent Application No. 200880016950.6", Apr. 17, 2012, p. 20, Published in: CN.
Chinese Patent Office, "Office Action re Chinese Patent Application No. 200980140004.7", Aug. 9, 2012, p. 10, Published in: CN.
Wang, Ying, "Response to Office Action re Chinese Patent Application 2008-80101640.4", Jun. 1, 2012, p. 2, Published in: CN.
Marannino, M., "Supplementary European Search Report re EP Application No. 08 79 7115", Oct. 18, 2012, p. 6, Published in: EP.
Japanese Patent Office, "Office Action re Japanese Application No. 2010-519272", May 25, 2012, p. 7, Published in: JP.
Korean Patent Office, "Office Action re Korean Patent Application No. 10-2011-7004034", Jun. 19, 2012, p. 5, Published in: KR.
Korean Patent Office, "Office Action re Korean Patent Application No. 10-2010-7002310", Aug. 13, 2012, p. 6, Published in: KR.
Rutland Wallis, Michael, "Office Action re U.S. Appl. No. 12/326,209", Mar. 23, 2012, p. 22, Published in: US.
Lee III, Henry E., "Office Action re Patent Application No. 12/122,950", Jun. 7, 2012, p. 20.
Rutland Wallis, Michael, "Office Action re U.S. Appl. No. 12/326,209", Nov. 17, 2011, p. 31, Published in: US.
Gardner, Shannon M., "Office Action re U.S. Appl. No. 13/053,331", Nov. 21, 2012, p. 9, Published in: US.
Baharlou, Simin, "International Preliminary Report on Patentability re Application No. PCT/US2009/054904", Jan. 24, 2012, p. 6, Published in: CH.
Lindner, Nora, "International Preliminary Report on Patentability re Application No. PCT/US12/023081", Aug. 9, 2012, Published in: CH.
O'Dowd, Sean R., "Response to Office Action re U.S. Appl. No. 12/326,209", Feb. 17, 2012, p. 9, Published in: US.
O'Dowd, Sean R., "Response After Final Under 37 CFR 1.116 re U.S. Appl. No. 12/326,209", May 23, 2012, p. 6, Published in: US.
Tsukinokisawa, Masashi, "Japanese Office Action re Application No. 2010-509503", Jan. 4, 2013, p. 8 Published in: JP.
"Response to Japanese Office Action re Application No. 2010-509503", Apr. 17, 2013, p. 15, Published in: JP.
"Taiwan Office Action re Application No. 097118856", May 17, 2013, p. 6, Published in: TWN.
TIPO, "Taiwan Office Action re Application No. 097118856", Mar. 5, 2014, p. 5, Published in: TW.

\* cited by examiner

COMMON MODE FILTER SYSTEM AND METHOD FOR A SOLAR POWER INVERTER

PRIORITY

The present application claims priority to provisional patent application No. 60/939,807, filed May 23, 2007, entitled: COMMON MODE FILTER FOR SOLAR INVERTER, which is incorporated by reference herein in its entirety.

FIELD OF THE INVENTION

This invention relates generally to apparatus and methods for converting solar energy to electrical energy, and more specifically to apparatus and methods for more efficient conversion of solar energy to electrical energy.

BACKGROUND OF THE INVENTION

In photovoltaic (PV) energy systems, inverters are used to convert DC electrical energy that is generated by photovoltaic panels to AC electrical energy that is compatible with the AC distribution systems that are built into the infrastructure of residential, commercial, industrial premises, and large ground mounted solar farms.

Typically an inverter is hard grounded (e.g., on the negative rail of the inverter DC input) and an isolation transformer is utilized in connection with the inverter to galvanically isolate the inverter from the AC power system of the premises and to provide a voltage ratio change. Transformers, however, add additional inefficiencies, complexity, weight and substantial cost to inverters.

For inverter applications large enough to warrant a dedicated connection to the utility (e.g., a utility transformer connecting the inverter to the utility's own medium voltage supply), it is often possible to remove the integrally provided transformer from the product. Although purchased as "transformerless," the operation of such inverters is still predicated on the presence of an isolating transformer to allow for the traditionally hard-grounded PV array configuration. Although inverters have been marketed as being "transformerless" because, when sold, a transformer is not integrated with these inverters, the power distribution system (e.g., 480/277 VAC) of the premises is still isolated from the inverter by a utility transformer. As a consequence, these "transformerless" inverters still rely on a transformer for isolation and are typically limited to installations where medium voltage (e.g., 4160 to 13 KV) transformers are present at the premises.

There is not presently a large PV inverter (e.g., an inverter larger than 10 kW) intended to operate independent of any isolating transformer. Presently available equipment also does not allow inversion directly into 480VAC three-phase, but rather into much lower voltages that are ratio-changed to more useful voltages such as 480 Volts by the integrally provided transformer. Accordingly, a system and method are needed to address the shortfalls of present technology and to provide other new and innovative features.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment the invention may be characterized as a photovoltaic system that includes a photovoltaic array, a distribution system that distributes power within a premises of a demand-side energy consumer, an inverter coupled to the distribution system that is configured to convert DC power from the photovoltaic array to AC power and apply the AC power to the distribution system, a damping portion configured to damp high frequency voltages derived from the inverter, and trapping circuitry coupled to the damping portion that is configured to reduce a level of low frequency current traveling through the damping portion.

In another embodiment the invention may be characterized as a power conversion device. The power conversion device in this embodiment comprises inputs adapted to receive DC power, an inverter portion configured to convert the DC power to AC power, outputs adapted to apply the AC power to a distribution system of a premises of a demand-side energy consumer, a damping portion configured to damp high frequency voltages derived from the inverter so as to enable the inverter portion to couple with the distribution system without an isolation transformer, and a trapping portion that is configured to reduce a level of low frequency current traveling through the damping circuit.

In yet another embodiment the invention may be characterized as a method for applying power to a distribution system of a premises of a demand-side energy consumer. The method in this embodiment includes generating DC power from a renewable source of energy, converting the DC power to AC power, applying the AC power directly to the distribution system of the premises, and filtering high frequency voltages so as to reduce an amount of high frequency voltages propagating to the distribution system and the PV array.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
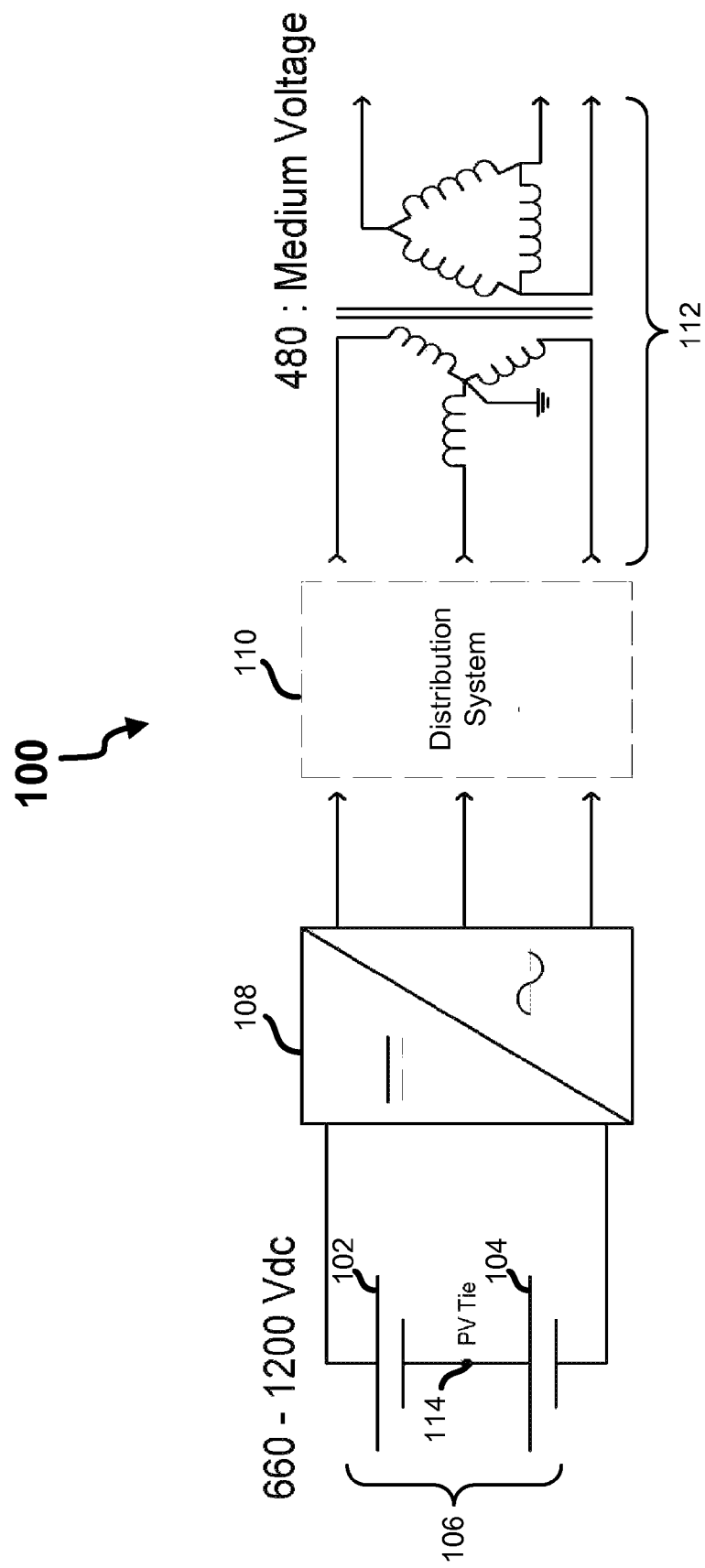
FIG. 1 is a block diagram depicting an exemplary embodiment of a photovoltaic system.

Referring first to FIG. 1, shown is a block diagram an exemplary embodiment of the present invention. As shown, in this embodiment a first set 102 and a second set 104 of photovoltaic panels are arranged to create a bipolar panel array 106 that is coupled to an inverter 108, which is disposed between the panel array 106 and a distribution system 110. As shown, the distribution system 110 in this embodiment is coupled to the secondary side of a wye-configured medium-voltage to 480/277 three-phase transformer 112 that is grounded at its star point.

The illustrated arrangement of the components depicted in FIG. 1 is logical and not meant to be an actual hardware diagram; thus, additional components can be added or combined with the components that are depicted in an actual implementation. It should also be recognized that the components, in light of the disclosure herein, may be readily implemented by one of ordinary skill in the art.

As an example, the inverter 108 is depicted as coupling directly to the array 106, but this is certainly not required. In some embodiments, for example, a PV interface is interposed between the array 106 and the inverter 108. In these embodiments, the PV interface generally operates to enable the inverter 108, which is designed to operate at lower voltages, to be utilized in connection with the PV array 106 that operates at least a portion of the time (e.g., while unloaded) at a voltage that exceeds the designed operating voltage of the inverter 108. U.S. application Ser. No. 11/967,933, entitled Photovoltaic Inverter Interface Device, System and Method, which is incorporated herein by reference discloses exemplary PV interfaces that may be utilized in connection with one or more embodiments of the present invention.

In general, the photovoltaic array 106 converts solar energy to DC electrical power, which is converted to AC power (e.g., three-phase power) by the inverter 108. As shown, the AC power output by the inverter 108 is applied to the distribution system 110, which in many embodiments is the three phase distribution system of a demand-side energy consumer (e.g., a commercial entity, industrial entity, or collection of residential units). In other embodiments, however, it is contemplated that the distribution system 110 is a portion of a utility distribution system. The transformer 112 in the exemplary embodiment is configured to couple the distribution system 110 to medium voltage power provided by an electrical utility company.

In some embodiments, the cells in the array 106 include crystalline (e.g., monocrystalline or polycrystalline) silicon that operates in an open load state at 1200 Volts and operates in a loaded state between 660 and 960 Volts. And in other embodiments the array includes cells comprising amorphous silicon that operates in an open load state at 1400 Volts and a loaded state around 900 Volts. One of ordinary skill in the art will appreciate, however, that the photovoltaic array 102 may include a variety of different type photovoltaic cells that are disposed in a variety of different configurations. For example, the photovoltaic cells may be arranged in parallel, in series or a combination thereof.

As depicted, the first set of panels 102 and the second set of panels 104 are tied together, and as shown, in some embodiments, the first and second sets of panels 102, 104 are tied together outside of the inverter 108. In these embodiments, it is contemplated that a line (not shown) sized for relatively low currents will couple, via a fuse, the tie point 114 between the first and second sets of panels 102, 104 to ground during nighttime. This connection would be made by a relay and therefore reference the array in the conventional manner when it is not producing power.

This embodiment has the benefit of utilizing one lower gauge, and hence less costly, wire between the tie point 114 of the first and second panels 102, 104 and ground. U.S. application Ser. No. 12/022,147, entitled System and Method for Ground Fault Detection and Interruption, which is incorporated herein be reference, discloses, among other technical advancements that may be utilized in connection with embodiments of the present invention, techniques for tying panels (e.g., the first and second sets of panels 102, 104) together.

In other embodiments, however, the first and second sets of panels 102, 104 are tied together within the inverter 108 via a normally open switch that is closed during operation of the inverter 108.

Beneficially, the embodiment depicted in FIG. 1, unlike typical approaches, does not include a separate isolation transformer between the inverter 108 and the distribution system 110, and as a consequence, efficiency of the system is increased while the cost, size, and weight of the inverter 108 are decreased.

Moreover, multiple inverters may be placed side by side without an isolation transformer. And beneficially, the number of inverters that may be placed side by side is virtually unlimited, and the inverters may be placed in a convenient location (e.g., away from an entry point of utility power to a building).

Figure 2:
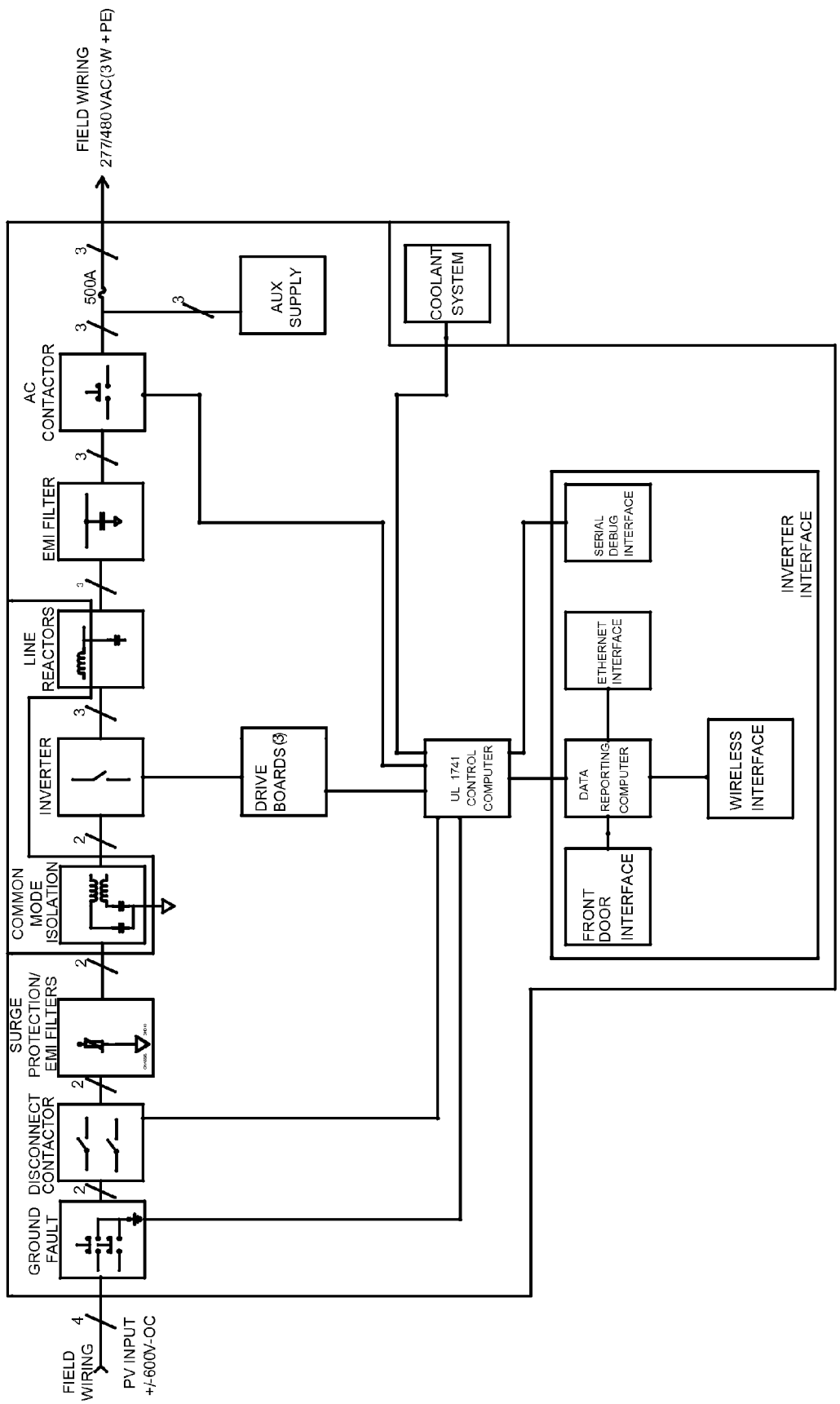
FIG. 2 is a schematic representation of an exemplary embodiment of the inverter described with reference to FIG. 1.

Referring next to FIG. 2, shown is an exemplary embodiment of the inverter 108 depicted in FIG. 1. As shown, the inverter in this embodiment includes a ground fault portion, disconnect contactor, surge protection, a common mode choke, an inverter portion, line reactors, AC contactor, and EMI filter aligned in series. In addition, a drive board is shown coupled between the inverter and a control computer, and the control computer is coupled to an inverter interface that includes a front door interface, a data reporting computer, and Ethernet interface and a wireless interface.

As depicted, in this embodiment the common mode choke is located on the DC side of the converter, but this is not required, and in other embodiments, the common mode choke may be positioned on the AC side of the inverter. It has been found that capacitance of the solar array to ground may cause undesirable instability of the inverter. The addition of filtering components (e.g., common mode choke and other filter components) prevents this undesirable behavior.

As discussed further herein, it has also been found that eliminating the isolation transformer that is normally interposed between an inverter and a distribution system (e.g., distribution system 110) may lead to high frequency (e.g., 18 kHz) common mode voltages propagating to the photovoltaic system. These high frequency voltages may vary in frequency depending upon the switching frequency of the inverter, but they may create adverse consequences relative to other inverters that may be coupled to the distribution system or other loads in the distribution system.

In addition, it has been found that when the high frequency voltages are filtered, 180 Hz voltages that originate from pulse width modulation saturation may also propagate through the high frequency filter, which creates substantial energy losses and heat generation. Moreover, 60 Hz voltage fluctuations due, for example, to asymmetrical loading, may propagate through the distribution system.

As a consequence, the common mode choke in the exemplary embodiment is implemented in connection with damping circuitry to remove the high frequency voltages (e.g., 18 kHz) in connection with low frequency (e.g., 180 Hz) traps to prevent the flow of the 180 Hz voltages through the damping circuitry.

Figure 3:
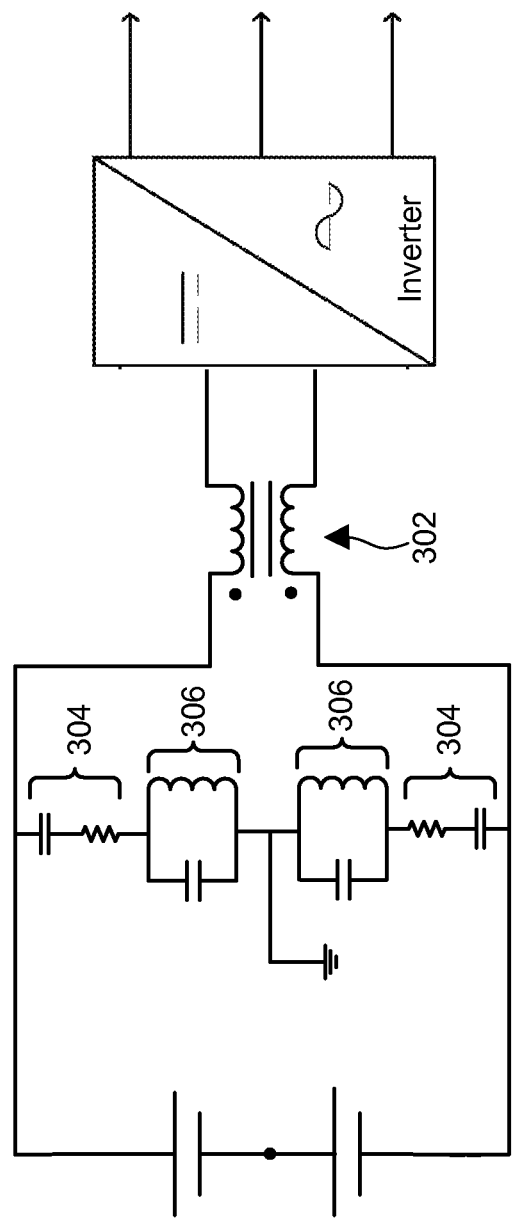
FIG. 3 is a schematic representation of an embodiment that may be utilized in connection with the embodiments described with reference to FIGS. 1 and 2.

Referring to FIG. 3, for example, shown is a schematic representation of a common-mode choke 302 used in connection with damper networks 304 and a parallel resonant tank circuits 306 that operate as traps for 180 Hz voltages that may be used in connection with the embodiments described with reference to FIGS. 1 and 2. In operation, the damper networks 304 filter the high frequency voltages (e.g., 18 kHz) and the parallel resonance tank circuits 306 operate to create a high impedance for 180 Hz frequencies. As a consequence, the damper circuits 304 remove potentially harmful high frequency currents and the parallel resonance tank circuits 306 prevent 180 Hz voltages from creating substantial energy losses by preventing 180 Hz current from flowing through the damper networks 304.

Although not required, the capacitor in each of the damper networks 304 may be realized by a 60 microfarad capacitor and the resistor in each of the networks 304 may be implemented with a 50 Ohm resistor. In addition, the capacitor in the parallel resonance tank circuits 306 may be implemented with a 40 microfarad capacitor and the inductor may be realized by a 19.5 milliHenry inductor. The combination of the parallel inductor and capacitor act as an open circuit at 180 Hz allowing high frequencies to be attenuated but not dissipating excessive power at 180 Hz.

Figure 4:
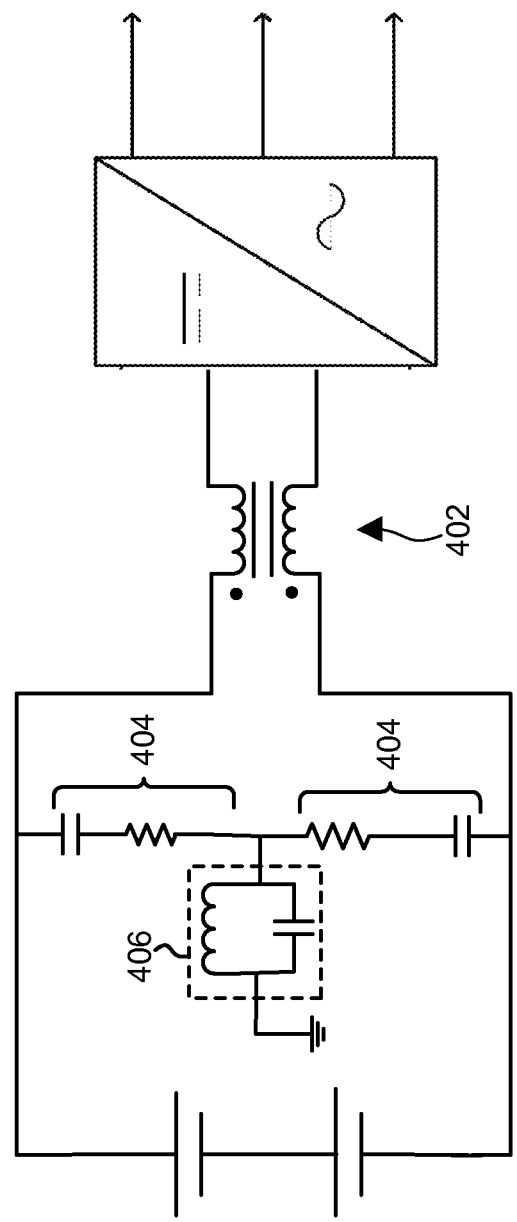
FIG. 4 is a schematic representation of another embodiment that may be utilized in connection with the embodiments described with reference to FIGS. 1 and 2.

Referring to FIG. 4, shown is a schematic representation of an alternative to the embodiment described with reference to FIG. 3. As shown, this embodiment is substantially the same as the embodiment depicted in FIG. 3, except the parallel resonant tank circuits 306 described with reference to FIG. 3 have been replaced by a single parallel resonant tank circuit 406 that also operates as a trap for 180 Hz voltages. In operation, the damper networks 404 filter the high frequency voltages (e.g., 18 kHz) and the parallel resonance tank circuit 406 operates to create a high impedance for 180 Hz frequencies using fewer components than the resonance tanks circuits 306.

Figure 5:
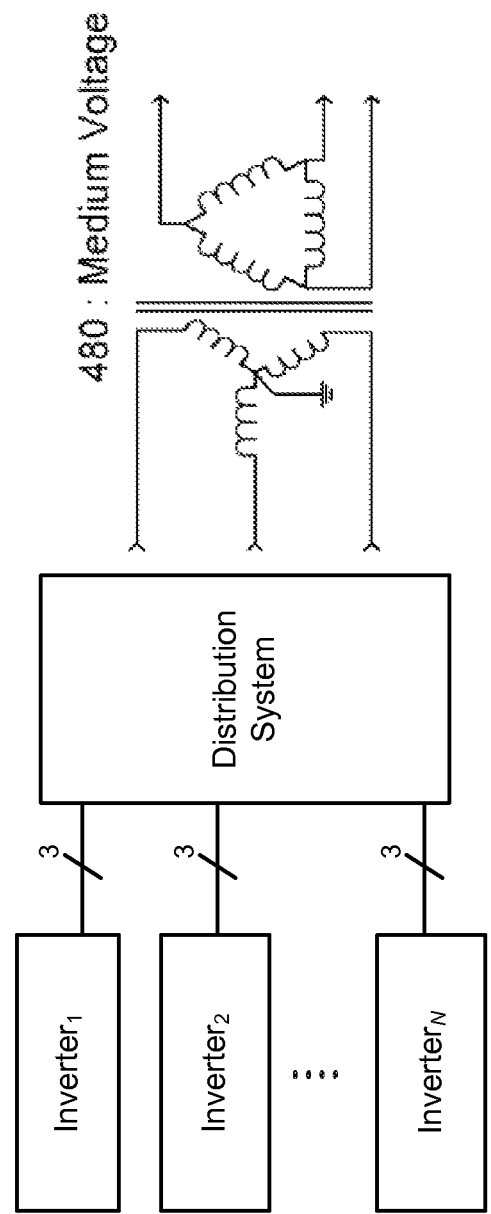
FIG. 5 is a block diagram depicting an exemplary inverter-system architecture.

Referring next to FIG. 5, shown is an exemplary embodiment of an inverter-system architecture. As shown, in this embodiment N inverters are configured to operate in connection with a single distribution system without requiring the use of isolation transformers. Beneficially, a common mode choke (e.g., the common mode chokes discussed with reference to FIGS. 2, 3, and 4) in connection with damping networks (e.g., damping networks 304, 404) enable multiple inverters to be utilized with the same distribution system without corresponding isolation transformers; thus allowing a multiple-inverter system to be realized without the need for installing expensive, bulky and heavy isolation transformers.

Figure 6:
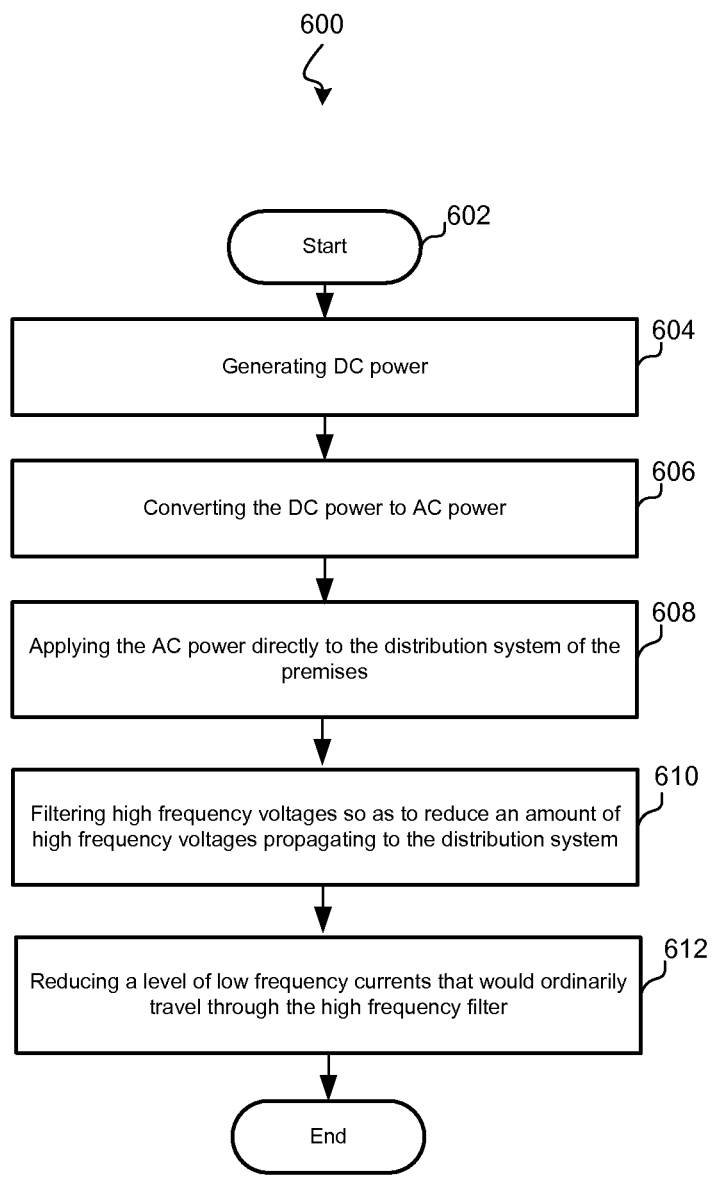
FIG. 6 is a flowchart depicting an exemplary method that may be carried out in connection with the embodiments discussed with reference to FIGS. 1-5.

Referring next to FIG. 6, shown is a flowchart depicting an exemplary method that may be carried out in connection with the embodiments described with reference to FIGS. 1-5. As shown, DC power is initially generated (e.g., from a renewable source of energy such as solar energy captured by the array 106)(Blocks 602, 604), and the DC power is converted to AC power (e.g., by an inverter described with reference to FIGS. 1-5)(Block 606) before the AC power is applied to a distribution system (e.g., a distribution system for a large residential, commercial, or industrial facility)(Block 608). In many embodiments, the AC power is directly applied to the distribution system (e.g., without interposing an isolation transformer between the inverter and the distribution system).

As depicted in FIG. 6, in many implementations, high frequency components that may be generated by the inverter are filtered so as to reduce or prevent the high frequency components that would ordinarily propagate to the source of the DC power (e.g., array 106) or to other devices (e.g., other inverters or electronic devices) that may be coupled to the distribution system (Block 610). In addition, in some embodiments it has been found that it is advantageous to reduce the flow of low frequency currents that may otherwise flow through the filter(s) for the high frequency voltages (Block 612). As previously discussed for example, 180 Hz voltages that originate from pulse width modulation saturation may propagate through the high frequency filter, and create substantial energy losses and heat generation.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention.

What is claimed is:

1. A photovoltaic system comprising:
    a photovoltaic array;
    a distribution system, wherein the distribution system distributes power away from the photovoltaic array;
    N inverters coupled to the distribution system, each of the N inverters is configured to convert DC power from the photovoltaic array to AC power and apply the AC power to the distribution system;
    N attenuating components, each of the N attenuating components is coupled to a corresponding one of the N inverters, and each of the N attenuating components is disposed to attenuate common-mode high frequency voltages derived from each of a corresponding one of the N inverters, and each of the N attenuating components is disposed in series with a current loop to block common-mode currents in the current loop that includes a corresponding one of the N inverters, the photovoltaic array, ground, and the distribution system, thereby enabling each of the N inverters to be coupled to the distribution system without an isolation transformer, wherein a portion of the current loop between the photovoltaic array and ground is a capacitance of the photovoltaic array to ground, wherein the frequency of the high frequency voltages is a function of the switching of the N inverters; and
    N damping components disposed in parallel to the capacitance of the photovoltaic array to ground and sized to damp the common-mode currents which are potentially excited by the common-mode high frequency voltages derived from the N inverters and to prevent instability due to the attenuating components and the capacitance of the photovoltaic array to ground, each of the N damping components is coupled to a corresponding one of the N inverters, wherein N is greater than one.

2. The system of claim 1, wherein the photovoltaic array is a bi-polar array including a first-array-portion configured to operate above ground, and a second array portion configured to operate below ground.

3. The system of claim 1, wherein the distribution system is a three-phase distribution system.

4. The system of claim 1, wherein each of the N damping components is housed within a corresponding one of the N inverters.

5. The system of claim 1, wherein each of the N damping components include damping components configured to damp common-mode high frequency voltages that have frequencies around 18 kHz.

6. The system of claim 1, including:
    N trapping circuits, each of the N trapping circuits arranged in series with a corresponding one of the N damping components to reduce a level of low frequency current traveling through at least some of the N damping components.

7. The system of claim 1, wherein the N inverters are configured to convert the DC power from the photovoltaic array directly into 480 VAC three-phase power.

8. A method for applying power to a distribution system, comprising:
generating DC power from a photovoltaic array;
converting the DC power to AC power with N inverters;
applying the AC power directly to the distribution system with the N inverters without an isolation transformer;
attenuating, with N attenuating components, common-mode high frequency voltages generated during the conversion of the DC power to the AC power to block common-mode currents in current loops that includes each of the N inverters, the photovoltaic array, ground, and the distribution system wherein a portion of the current loops between the photovoltaic array and ground is a capacitance of the photovoltaic array to ground, wherein the frequency of the high frequency voltages is a function of the switching of the N inverters, wherein each of the N attenuating components is coupled to a corresponding one of the N inverters; and
damping, with N damping components, common-mode currents-which are potentially excited by the common-mode high frequency voltages derived from the N inverters and to prevent instability due to the attenuating and the capacitance of the photovoltaic array to ground, wherein N is greater than one.

9. The method of claim 8, wherein generating includes:
generating DC power with a first photovoltaic array configured to operate above a ground potential;
generating DC power with a second photovoltaic array configured to operate below a ground potential;
tying a negative rail of the first photovoltaic array to a positive rail of the second photovoltaic array so as to create a bipolar array; and
applying power from the positive rail of the first array and the negative rail of the second array to the inverter.

10. The system of claim 6, wherein the trapping circuitry is configured to substantially prevent 180 Hz current from flowing through the damping circuitry.

11. A power conversion device comprising:
N inverters configured to convert DC power to AC power and apply the AC power to a distribution system;
means for attenuating common-mode high frequency voltages derived from the N inverters, the means for attenuating including means for blocking common-mode currents in a current loop that includes the N inverters, a photovoltaic system, ground, and the distribution system wherein a portion of the current loop between the photovoltaic system and ground is a capacitance of the photovoltaic system to ground, wherein the frequency of the high frequency voltages is a function of the switching of the N inverters; and
means for damping common-mode resonances created by the capacitance of the photovoltaic system to ground, the distribution system and the N inverters, which are potentially excited by the common-mode high frequency voltages derived from the N inverters, wherein N is greater than one.

12. The power conversion device of claim 11, including:
means for trapping low frequency current so as to reduce an amount of the low frequency current that flows through the means for damping.

13. The power conversion device of claim 12, wherein the means for trapping includes means for trapping 180 Hz current from flowing through the damping circuitry.

* * * * *